(12) United States Patent
Jung

(10) Patent No.: US 8,600,600 B2
(45) Date of Patent: Dec. 3, 2013

(54) SYSTEM FOR DRIVING SPHERICAL WHEEL

(75) Inventor: Ui Jung Jung, Gyeonggi-do (KR)

(73) Assignee: Hyundai Motor Company, Seoul (KR)

(*) Notice: Subject to any disclaimer, the term of this patent is extended or adjusted under 35 U.S.C. 154(b) by 0 days.

(21) Appl. No.: 13/533,294

(22) Filed: Jun. 26, 2012

(65) Prior Publication Data

US 2013/0151043 A1   Jun. 13, 2013

(30) Foreign Application Priority Data

Dec. 8, 2011   (KR) .......................... 10-2011-0131193

(51) Int. Cl.
*B60L 9/00*   (2006.01)

(52) U.S. Cl.
USPC .............................................. 701/22; 701/41

(58) Field of Classification Search
USPC ....................................................... 701/22, 41
See application file for complete search history.

(56) References Cited

U.S. PATENT DOCUMENTS

| | | | | |
|---|---|---|---|---|
| 2,951,377 A | * | 9/1960 | Lahde | 74/5.6 R |
| 3,105,657 A | * | 10/1963 | Mueller et al. | 244/166 |
| 3,683,840 A | * | 8/1972 | Russell | 440/12.7 |
| 3,746,117 A | * | 7/1973 | Alred | 180/21 |
| 3,858,673 A | * | 1/1975 | Browning | 180/211 |
| 4,785,899 A | * | 11/1988 | von Winckelmann | 180/7.1 |
| 7,644,787 B2 | * | 1/2010 | Phelan | 180/7.1 |
| 7,843,294 B2 | * | 11/2010 | Fullerton et al. | 335/296 |
| 8,269,447 B2 | * | 9/2012 | Smoot et al. | 318/489 |
| 8,459,383 B1 | * | 6/2013 | Burget | 180/7.1 |
| 2008/0182479 A1 | * | 7/2008 | Elliott et al. | 446/73 |
| 2010/0264756 A1 | * | 10/2010 | Lee et al. | 310/38 |
| 2013/0113307 A1 | * | 5/2013 | Kim et al. | 310/40.5 |

FOREIGN PATENT DOCUMENTS

| | | | | |
|---|---|---|---|---|
| JP | 2005-75328 | * | 3/2005 | ............. B60B 19/14 |
| KR | 10-2010-0090437 A | | 8/2010 | |

OTHER PUBLICATIONS

KR Application No. 10-2009-0009706, Application Date Feb. 6, 2009, Publication Date Aug. 16, 2010, Machine language translation, all pages.*

* cited by examiner

*Primary Examiner* — Calvin Cheung
(74) *Attorney, Agent, or Firm* — Edwards Wildman Palmer LLP; Peter F. Corless

(57) ABSTRACT

Disclosed is a system for driving a spherical wheel that includes a rotating sphere having a plurality of magnetic modules and a fixed body. The fixed body has coil modules that generate a magnetic field by current and partially enclose the rotating sphere so that a portion of the rotating sphere is exposed. A support wheel disposed between the rotating sphere and the fixed body is configured to maintain a substantially constant distance between the rotating sphere and the fixed body and rotatably support the rotating sphere. A sensor provided in at least one of the rotating sphere and the fixed body is configured to measure a rotational speed and a position of the rotating sphere, and a control device is configured to receive driving signals, the rotational velocity and the position measured by the sensor and to transmit a control signal supplying a current to the coil module.

6 Claims, 7 Drawing Sheets

SYSTEM FOR DRIVING SPHERICAL WHEEL

CROSS-REFERENCE TO RELATED APPLICATION

This application claims priority to and the benefit of Korean Patent Application No. 10-2011-0131193 filed in the Korean Intellectual Property Office on Dec. 8, 2011, the entire contents of which are incorporated herein by reference.

FIELD OF THE INVENTION

The present invention relates to a system for driving a spherical wheel, and more particularly to a system for driving a spherical wheel that moves a spherical wheel in all directions and is directly driven.

BACKGROUND OF THE INVENTION

Recently, an in-wheel motor where a wheel is directly connected with a motor so as to drive a wheel directly has become most noticeable. However, the in-wheel motor as well as a conventional wheel driving type has one degree of freedom (DOF). Accordingly, the in-wheel motor cannot move a vehicle in all directions.

To solve such a problem, a spherical linkage or spherical wheel is applied to a wheel of the vehicle. However, a vehicle or driving apparatus using a spherical linkage or a spherical wheel (e.g., U.S. Pat. No. 4,785,899 and U.S. Patent Publication No. 2002-0153205) is hard to control or to achieve three degrees of freedom movement. Further, it is disclosed that the spherical wheel is driven by a magnetic force generated by a magnet and a coil (e.g., Korea Patent Publication No. 10-2009-0093523 and U.S. Pat. No. 6,906,441), but it is challenging to set a constant position of the magnet because the wheel of the vehicle rotates in any direction.

The above information disclosed in this Background section is only for enhancement of understanding of the background of the invention and therefore it can contain information that does not form the prior art that is already known in this country to a person of ordinary skill in the art.

SUMMARY OF THE INVENTION

The present invention has been made in an effort to provide a system for driving a spherical wheel having advantages of efficiently moving a vehicle in all directions depending on a direction set by a user.

A system for driving a spherical wheel according to an exemplary embodiment of the present invention can include: a rotating sphere having a plurality of magnetic modules; a fixed body having a plurality of coil modules adapted and configured to generate a magnetic field by current and partially enclosing the rotating sphere such that a portion of the rotating sphere is exposed; a support wheel disposed between the rotating sphere and the fixed body, the support wheel adapted and configured to (i) maintain a substantially constant distance between the rotating sphere and the fixed body and (ii) rotatably supporting the rotating sphere; a sensor provided in at least one of the rotating sphere and the fixed body, the sensor adapted and configured to measure a rotational speed and a position of the rotating sphere; and a control device adapted and configured to receive driving signals and the rotational velocity and the position measured by the sensor and to transmit a control signal supplying a current to the coil module.

The magnetic module can be a coil.

The magnetic modules can be positioned in a circumferential direction of the rotating sphere at an even distance, and coil modules can be positioned in a circumferential direction of the rotating sphere so as to correspond to the magnetic modules.

The magnetic module can be inserted in the rotating sphere and be disposed close to an exterior circumference of the rotating sphere.

Each coil module can be inserted in the fixed body and disposed close to an interior circumference of the fixed body.

The control device can divide the coil modules into several parts according to the rotating direction of the rotating sphere rotated by the driving signals and sequentially supply current to each part of the coil modules.

Figure 1:
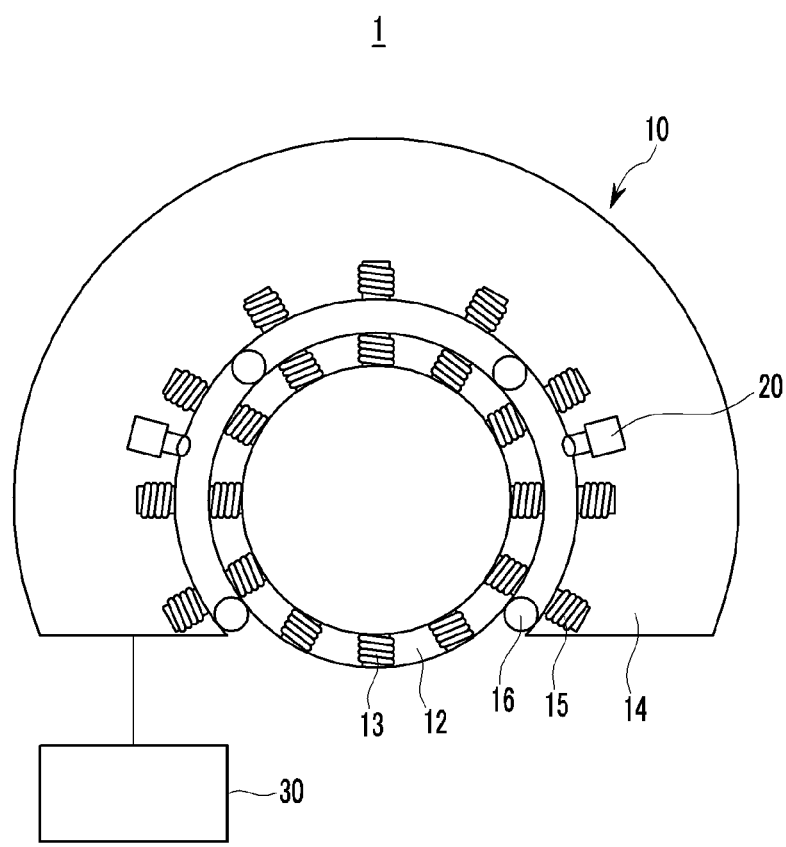
FIG. 1 is a schematic diagram of a system for driving a spherical wheel according to an exemplary embodiment of the present invention.

The following list of reference characters is provided for the reader's convenience:

| | |
|---|---|
| 1: system for driving spherical wheel | |
| 10: spherical wheel | |
| 12: rotating sphere | 13: magnetic module |
| 14: fixed body | 15: coil module |
| 16: support wheel | |
| 20: sensor | |
| 30: control device | |

DETAILED DESCRIPTION OF THE EMBODIMENTS

Exemplary embodiments of the present invention will be described in detail with reference to the accompanying drawings so as to be easily practiced by a person skilled in the art.

Such exemplary embodiments are exemplary embodiments according to the present invention. Since a person skilled in the art can realize the present invention in various forms, it is to be understood that the scope of the present invention is not limited to exemplary embodiments which will be hereinafter described.

Figure 2:
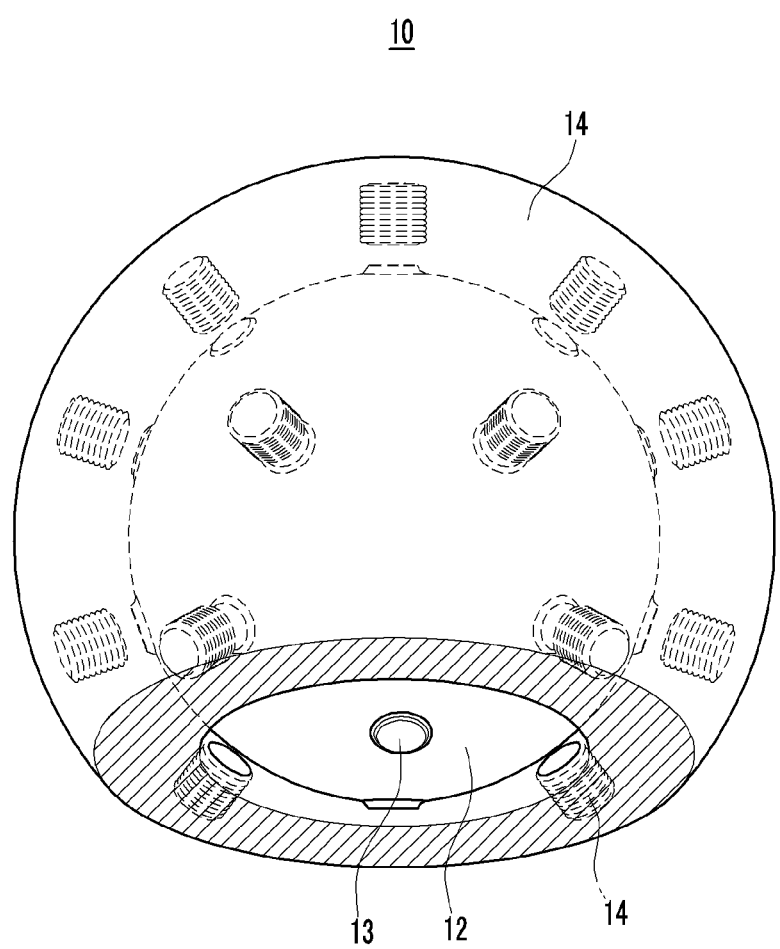
FIG. 2 is a schematic diagram of a spherical wheel according to an exemplary embodiment of the present invention.

FIG. 1 is a schematic diagram of a system for driving a spherical wheel according to an exemplary embodiment of the present invention, and FIG. 2 is a schematic diagram of a spherical wheel according to an exemplary embodiment of the present invention.

A system 1 for driving a spherical wheel is adapted to change a magnetic field so as to move a vehicle in all directions and drive other spherical wheels independently. Referring to FIG. 1 and FIG. 2, the system 1 for driving the spherical wheel includes the spherical wheel 10, a sensor 20, and a control device 30.

The spherical wheel 10 has three rotational degrees of freedom so as to move in all directions. The spherical wheel 10 includes a rotating sphere 12, a fixed body 14, and one or more support wheels 16.

The rotating sphere 12 rotates in a state of contacting a bottom surface and includes a plurality of magnetic modules 13 affected by a magnetic field. The rotating sphere 12 can be provided in various types. According to an exemplary embodiment, the rotating sphere 12 can be a hollow sphere.

The plurality of magnetic modules 13 are inserted in the rotating sphere 12 and disposed close to an exterior circumference of the rotating sphere 12. Also, the magnetic modules 13 are provided in a radial direction of the rotating sphere 12 and are positioned circumferentially at an even distance. According to an exemplary embodiment, a polygon formed by connecting all the plurality of magnetic modules 13 can be a dodecahedron or an icosahedron. As shown in the drawings, the magnetic module 13 is affected by a magnetic field generated by a coil module 15 of a fixed body 14. According to an exemplary embodiment, the magnetic module 13 can be, but is not limited to, a coil. However, the magnetic module 13 can be a metal block. Also, the exterior circumference of the rotating sphere 12 can be a metal surface. The rotating sphere 12 can be driven by electromagnetic induction generated by a change of the magnetic field in the coil module 15 of the fixed body 14.

The fixed body 14 partially encloses the rotating sphere 12 such that a portion of the rotating sphere 12 is exposed. The fixed body 14 includes a plurality of coil modules 15 that generates a magnetic field by a current. The fixed body 14 can be provided in various configurations according to an object coupled with the sphere wheel. However, the fixed body 14 should have an interior circumference that is substantially complimentary to the exterior circumference of the rotating sphere 12.

The plurality of coil modules 15 are inserted in the fixed body 14 and disposed close to the interior circumference of the fixed body 14. Further, each of the coil modules 15 corresponds to one of the plurality of magnetic modules 13. In further detail, the magnetic modules 13 on the portion of the rotating sphere within the fixed body 14 and the coil modules 15 corresponding to each other are matched one to one. As described above, the magnetic modules 13 are positioned at the rotating sphere 12 circumferentially at an even distance, and the coil modules 15 are positioned in a circumferential direction of the rotating sphere 12 so as to correspond to the magnetic module 13. However, the coil module 15 cannot be provided at an end portion of the fixed body 14, that is, the exposed portion of the rotating sphere 12. Therefore, the number of magnetic modules 13 can be more than that of the coil modules 15.

The coil module 15 generates a magnetic field using a current supplied from a current supply apparatus (not shown).

The support wheel 16 is disposed between the rotating sphere and the fixed body so as to keep a constant distance between the rotating sphere 12 and the fixed body 14. Particularly, the support wheels 16 rotatably support the rotating sphere 12. The plurality of support wheels 16 are provided in various types. According to an exemplary embodiment, the support wheel 16 can be a ball caster, a ball bearing, or an omnidirectional wheel.

The sensor 20 is provided in at least one of the rotating sphere 12 and the fixed body 14, and measures a rotational speed and a position of the rotating sphere 12. According to an exemplary embodiment, the sensor 20, as shown in FIG. 2, is provided close to the interior circumference of the fixed body 14. The rotational speed of the rotating sphere 12 can be measured using an optic sensor or a magnetic sensor. Also, the position of the rotating sphere 12 can be calculated using an encoder.

The control device 30 is adapted to supply the current to the coil module 15. In further detail, the control device 30 receives driving signals set by a user and the rotational speed and the position measured by the sensor 20, and transmits a control signal supplying a current to the coil module. The driving signals include a movement of the spherical wheel, that is, direction and speed of the spherical wheel.

Particularly, the control device 30 is adapted to divide the coil modules 15 into several parts according to the rotating direction of the rotating sphere 12 rotated by the driving signals, and to supply a current to each part of the coil modules 15 sequentially.

Operation of the spherical wheel will hereinafter be described in detail.

Figure 3:
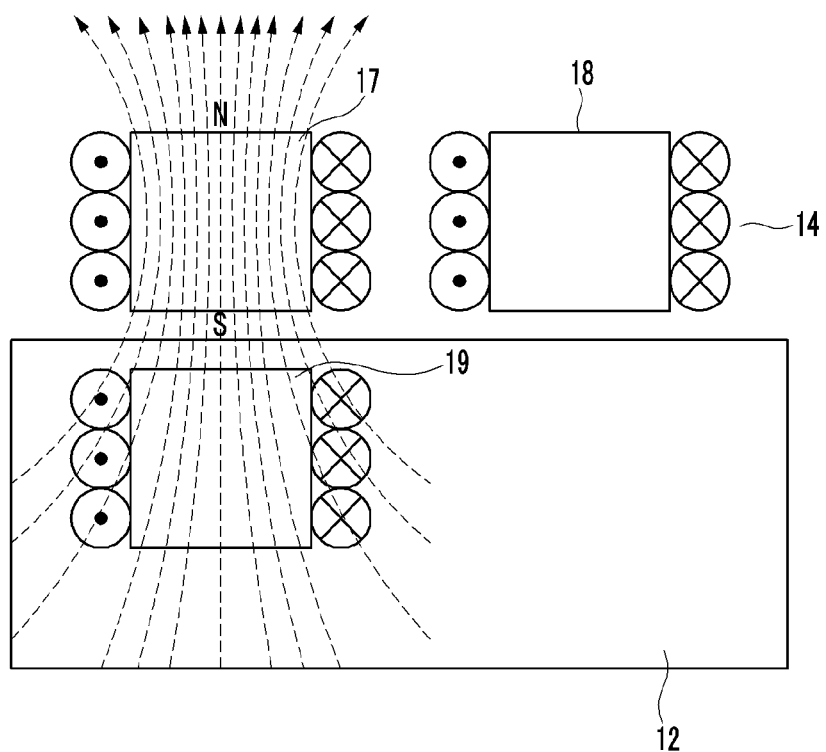
FIG. 3 and FIG. 4 are schematic diagrams for showing operation of a system for driving a spherical wheel according to an exemplary embodiment of the present invention.
Figure 4:
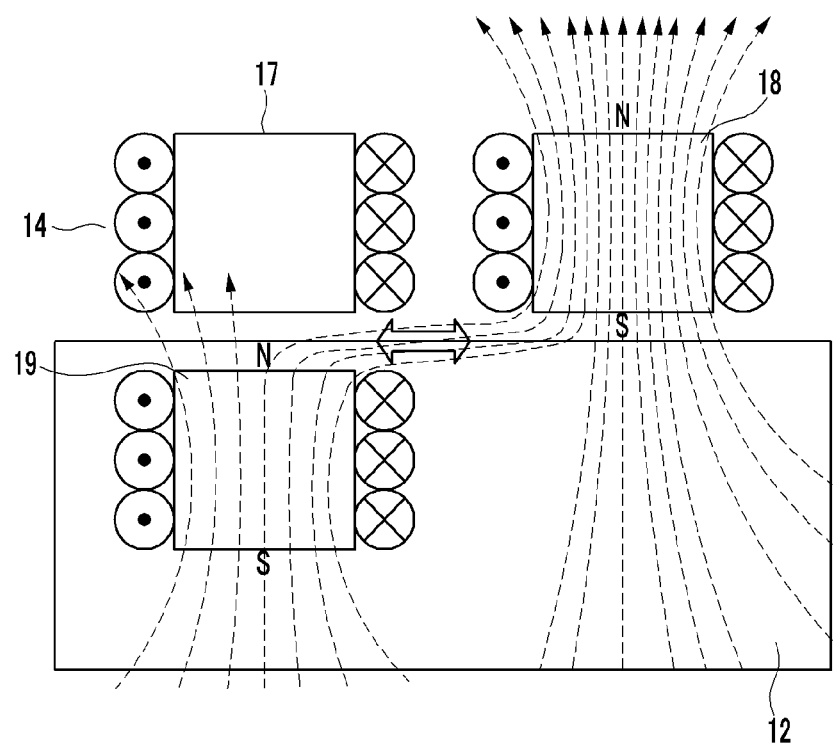

FIG. 3 and FIG. 4 are schematic diagrams for showing operation of a system for driving a spherical wheel according to an exemplary embodiment of the present invention.

As shown in FIG. 3 and FIG. 4, an exemplary embodiment where the magnetic module 13 of the rotating sphere 12 is the coil will be described. In FIG. 3 and FIG. 4, a dotted line represents a magnetic field and a bold arrow represents a magnetic force, that is, mutual attraction of the magnetic field.

When the control device 30 generates the magnetic field at the coil modules 15, the control device 30 divides the coil modules 15 into first coil modules 17 generating the magnetic field firstly and second coil modules 18 generating the magnetic field secondly depending on a rotational direction of the rotating sphere 12, and supplies the current sequentially to the first coil modules 17 and the second coil modules 18. The first coil module 17 and the second coil module 18 are disposed close to each other. Further, the coil 19 and the magnetic module 13 of the rotating sphere 12 are disposed corresponding to the first coil module 17.

If the current is supplied to the first coil module 17, the magnetic field generated in the first coil module 17 passes the coil 19 of the rotating sphere 12. After that, if the current having been supplied to the first coil module 17 is supplied to the second coil module 18, the magnetic field is generated in the second coil module 18. At this time, a current hindering a change of the magnetic field in the fixed body 14 is induced in the coil 19 of the rotating sphere 12. Accordingly, a magnetic field is generated in the coil 19 of the rotating sphere 12.

Therefore, a mutual attraction is generated between the magnetic field generated in the coil 19 of the rotating sphere 12 and the magnetic field generated in the second coil module 18. Accordingly, the movable rotating sphere 12 moves toward the second coil module 18.

Operation of the system 1 for driving the spherical wheel described above will now be described in detail.

Figure 5:
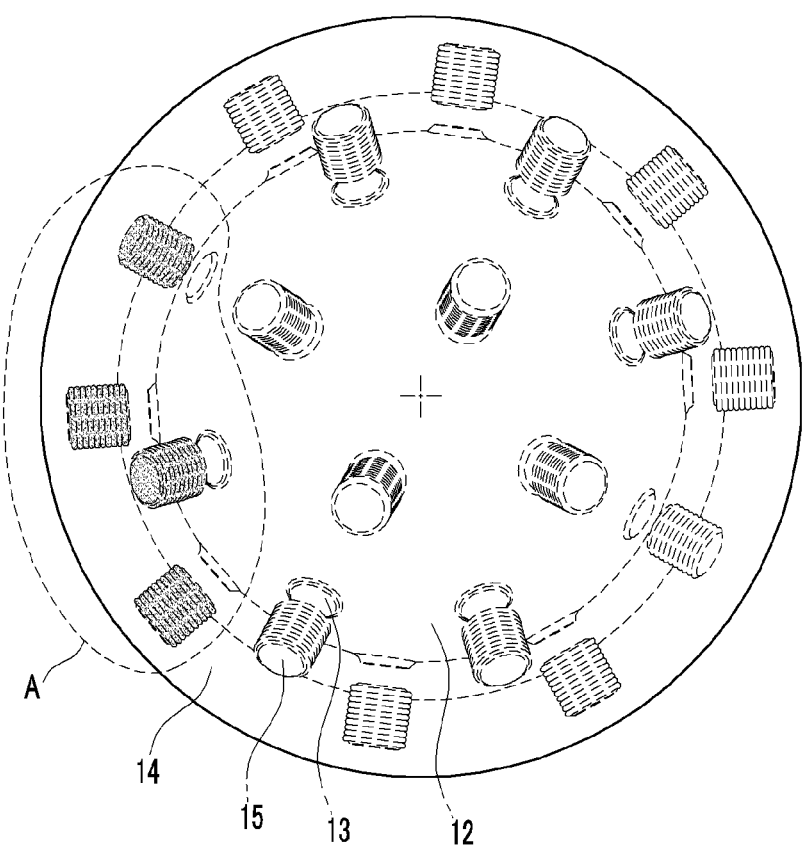
FIG. 5 to FIG. 7 are schematic diagrams for showing a movement of a magnetic field and a direction of a current applied to a coil module of a fixed body to a driving direction of a spherical wheel according to an exemplary embodiment of the present invention.
Figure 6:
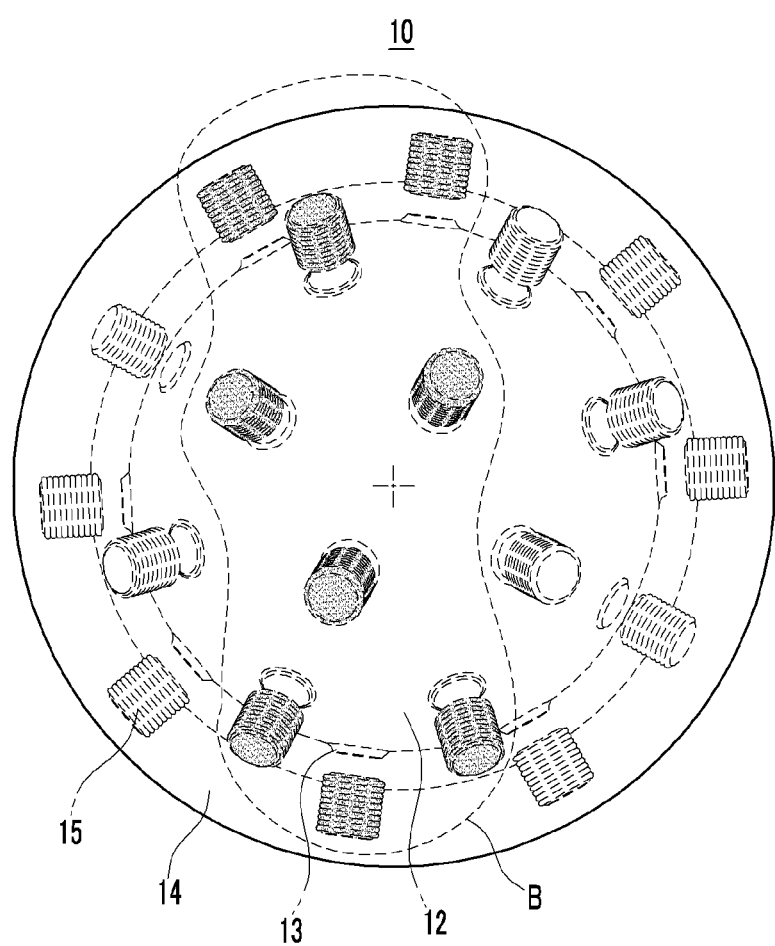
Figure 7:
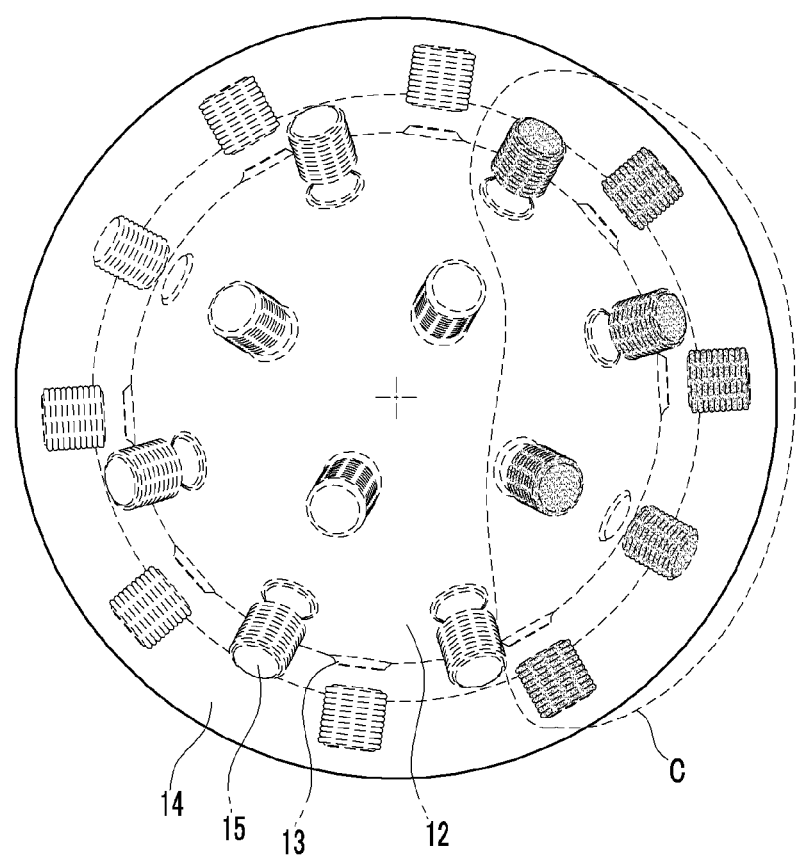

FIG. 5 to FIG. 7 are schematic diagrams for showing a movement of a magnetic field and a direction of a current applied to a coil module of a fixed body to a driving direction of a spherical wheel according to an exemplary embodiment of the present invention. The 'A' portion, 'B' portion, and 'C' portion in FIG. 5 to FIG. 7 are portions in the coil module 15 to which the current is supplied.

If a user sets a driving direction, the control device 30 transmits the control signal supplying the current to the coil module 15 depending on the driving signals. At this time, the control device 30 transmits the control signals taking into account the rotational speed and the position of the rotating sphere 12 received from the sensor 20.

The control device 30 divides the coil modules 15 into several parts according to the set rotating direction of the rotating sphere 12 and supplies the current to each part of the coil modules 15 sequentially.

According to an exemplary embodiment, it is shown in FIG. 5 to FIG. 7 that the spherical wheel is set to rotate from the left to the right.

The control device 30 divides the coil modules 15 of the fixed body 14 into several parts according to the set rotating direction of the spherical wheel. Therefore, after the current is supplied to the coil modules 15 disposed at the left, the current is supplied to the coil modules 15 disposed at the center and at the right, sequentially. That is, the current is supplied to the coil modules 15 of the 'A' portion in FIG. 5, the coil modules 15 of the 'B' portion in FIG. 6, and the coil modules 15 of the 'C' portion in FIG. 7, sequentially. Therefore, if the magnetic field changing from the left to the right is generated in the coil modules 15, a magnetic field is generated in the magnetic modules 13 corresponding to the coil modules 15 disposed at the left. Therefore, the rotating sphere 12 rotates by the mutual attraction between the magnetic field of the coil module 15 and the magnetic field of the magnetic module 13.

According to an exemplary embodiment of the present invention, the spherical wheel can efficiently move in all directions depending on a direction set by a user.

While this invention has been described in connection with what is presently considered to be practical exemplary embodiments, it is to be understood that the invention is not limited to the disclosed embodiments, but, on the contrary, is intended to cover various modifications and equivalent arrangements included within the spirit and scope of the appended claims.

What is claimed is:

1. A system for driving a spherical wheel, comprising:
   a rotating sphere having a plurality of magnetic modules;
   a fixed body having a plurality of coil modules adapted and configured to generate a magnetic field by current and partially enclosing the rotating sphere such that a portion of the rotating sphere is exposed;
   a support wheel disposed between the rotating sphere and the fixed body, the support wheel adapted and configured to (i) maintain a substantially constant distance between the rotating sphere and the fixed body and (ii) rotatably support the rotating sphere;
   a sensor provided in at least one of the rotating sphere and the fixed body, the sensor adapted and configured to measure a rotational speed and a position of the rotating sphere; and
   a control device adapted and configured to receive driving signals and the rotational velocity and the position measured by the sensor and to transmit a control signal supplying a current to the coil module.

2. The system of claim 1, wherein the magnetic module is a coil.

3. The system of claim 2, wherein the control device divides the coil modules into several parts according to the rotating direction of the rotating sphere rotated by the driving signals, and sequentially supplies current to each part of the coil modules.

4. The system of claim 1, wherein the magnetic modules are positioned in a circumferential direction of the rotating sphere at an even distance, and
   coil modules are positioned in a circumferential direction of the rotating sphere so as to correspond to the magnetic modules.

5. The system of claim 1, wherein the magnetic module is inserted in the rotating sphere and is disposed close to an exterior circumference of the rotating sphere.

6. The system of claim 1, wherein the coil module is inserted in the fixed body and is disposed close to an interior circumference of the fixed body.

\* \* \* \* \*